(12) United States Patent
Yang et al.

(10) Patent No.: US 8,230,510 B1
(45) Date of Patent: Jul. 24, 2012

(54) SCANNING COMPUTER DATA FOR MALICIOUS CODES USING A REMOTE SERVER COMPUTER

(75) Inventors: Shun-Fa Yang, Taipei (TW); Hung-Hao Cheng, Taipei (TW); Yi-Song Siao, Taipei (TW); Shih-Chien Kuo, Taipei (TW); Jia-Sin Huang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 965 days.

(21) Appl. No.: 12/244,584

(22) Filed: Oct. 2, 2008

(51) Int. Cl.
*G06F 19/00* (2011.01)
(52) U.S. Cl. ............... 726/24; 726/22; 726/25; 709/232
(58) Field of Classification Search .............. 726/22–25; 713/188; 709/232
See application file for complete search history.

(56) References Cited

U.S. PATENT DOCUMENTS

| | | | |
|---|---|---|---|
| 5,623,600 A | 4/1997 | Ji et al. | |
| 6,021,510 A | 2/2000 | Nachenberg | |
| 6,094,731 A | 7/2000 | Waldin et al. | |
| 6,195,587 B1 | 2/2001 | Hruska et al. | |
| 6,745,192 B1 | 6/2004 | Libenzi | |
| 6,748,538 B1 | 6/2004 | Chan et al. | |
| 6,847,995 B1 | 1/2005 | Hubbard et al. | |
| 6,938,097 B1 | 8/2005 | Vincent et al. | |
| 7,010,807 B1 | 3/2006 | Yanovsky | |
| 7,096,493 B1 | 8/2006 | Liu | |
| 7,099,853 B1 * | 8/2006 | Liu et al. | 706/45 |
| 7,127,740 B2 * | 10/2006 | Campagna | 726/12 |
| 7,143,113 B2 | 11/2006 | Radatti | |
| 7,185,015 B2 | 2/2007 | Kester et al. | |
| 7,203,959 B2 | 4/2007 | Nachenberg et al. | |
| 7,299,277 B1 | 11/2007 | Moran et al. | |
| 7,328,349 B2 | 2/2008 | Milliken | |
| 7,337,471 B2 | 2/2008 | Nachenberg et al. | |
| 7,373,643 B2 | 5/2008 | Radatti | |
| 7,406,454 B1 | 7/2008 | Liu et al. | |
| 7,519,726 B2 * | 4/2009 | Palliyil et al. | 709/232 |
| 7,650,639 B2 * | 1/2010 | Kramer et al. | 726/23 |
| 2004/0187023 A1 * | 9/2004 | Alagna et al. | 713/200 |
| 2006/0230272 A1 * | 10/2006 | Lawrence et al. | 713/176 |
| 2007/0101146 A1 | 5/2007 | Louch et al. | |
| 2007/0150948 A1 * | 6/2007 | De Spiegeleer | 726/22 |
| 2007/0162463 A1 | 7/2007 | Kester et al. | |
| 2007/0174909 A1 | 7/2007 | Burchett et al. | |

(Continued)

OTHER PUBLICATIONS

Binary diff/patch utility, 1 sheet [retrieved on May 30, 2008]. Retrieved from the internet: http://www.daemonology.net/bsdiff/, 2003.

(Continued)

*Primary Examiner* — Kim Vu
*Assistant Examiner* — Sayed Beheshti Shirazi
(74) *Attorney, Agent, or Firm* — Okamoto & Benedicto LLP (57) ABSTRACT

Scanning of files for malicious codes may be performed by calculating a first hash value of a file in a client computer and providing the first hash value of the file to a remotely located server computer. The server computer may compare the first hash value of the file to first hash values of malicious code patterns to determine if the file is possibly infected with malicious code. A malicious code pattern having a first hash value that matches that of the file may be forwarded from the server computer to the client computer. In the client computer, a second hash value of the file may be calculated and compared against a second hash value of the malicious code pattern to determine if the file is infected with the malicious code.

17 Claims, 11 Drawing Sheets

U.S. PATENT DOCUMENTS

| | | | |
|---|---|---|---|
| 2007/0180059 A1* | 8/2007 | Marl et al. ................... 709/219 |
| 2007/0234343 A1 | 10/2007 | Gouge et al. |
| 2007/0240218 A1 | 10/2007 | Tuvell et al. |
| 2007/0240222 A1* | 10/2007 | Tuvell et al. ................... 726/24 |
| 2007/0244920 A1* | 10/2007 | Palliyil et al. ................ 707/102 |
| 2008/0033942 A1 | 2/2008 | Kao et al. |
| 2008/0092235 A1 | 4/2008 | Comlekoglu |
| 2008/0095065 A1 | 4/2008 | Albrecht |
| 2008/0189784 A1* | 8/2008 | Mangione-Smith et al. ... 726/23 |
| 2008/0270520 A1* | 10/2008 | Reid et al. ..................... 709/203 |
| 2009/0300761 A1* | 12/2009 | Park et al. ...................... 726/23 |
| 2010/0017877 A1* | 1/2010 | Cooley et al. ................... 726/22 |
| 2010/0169972 A1* | 7/2010 | Kuo et al. ....................... 726/23 |

OTHER PUBLICATIONS

Summary Cache: A Scalable Wide-Area Web Cache Sharing Protocol, 2 sheets [retrieved on May 21, 2008]. Retrieved from the internet: http://pages.cs.wisc.edu/~cao/papers/summary-cache/share.html.

Bloom Filters—the math, 6 sheets [retrieved on May 22, 2008]. Retrieved from the internet: http://pages.cs.wisc.edu/~cao/papers/summary-cache/node8.html.

Bloom Filter—Wikipedia, the free encyclopedia, 7 sheets [retrieved on May 21, 2008]. Retrieved from the internet: http://en.wikipedia.org/wiki/Bloom_filter.

John Wack, et. al., "Guide to Firewall Selection and Policy Recommendations", Oct. 2001, 64 pages, National Institute of Standards and Technology (NIST) special publication.

Microsoft TechNet "Unsolicited Commercial E-Mail Prevention and Filtering Performance Analysis", Jan. 1999, pp. 1-14, retrieved from the internet: http://www.microsoft.com/technet/archive/mcis/rkspmcpa.mspx?pf=true.

Martin Roesch, "Snort—Lightweight Intrusion Detection for Networks", 1999, pp. 229-238 of the 13th LISA Conference proceedings. Retrieved from the internet: http://www.usenix.org/events/lisa99/full_papers/roesch/roesch_html/.

* cited by examiner

SCANNING COMPUTER DATA FOR MALICIOUS CODES USING A REMOTE SERVER COMPUTER

BACKGROUND OF THE INVENTION

1. Field of the Invention

The present invention relates generally to computer security, and more particularly but not exclusively to methods and apparatus for scanning computer data for malicious contents.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as "viruses." Antivirus products for protecting computers against malicious codes are commercially available. Experienced computer users have installed some form of antivirus in their computers.

A typical antivirus includes a scan engine and a pattern file. The pattern file comprises patterns for identifying known malicious codes. To check a file for malicious code, the scan engine opens the file and compares its content to patterns in the pattern file. While this pattern matching approach is relatively effective, the pattern file needs to be continually updated to address newly discovered malicious codes. As the number of known malicious codes increases, so does the size of the pattern file. The larger the pattern file, the more memory and processing resources are consumed to perform malicious code scanning.

SUMMARY

Scanning of files for malicious codes may be performed by calculating a first hash value of a file in a client computer and providing the first hash value of the file to a remotely located server computer. The server computer may compare the first hash value of the file to first hash values of malicious code patterns to determine if the file is possibly infected with malicious code. A malicious code pattern having a first hash value that matches that of the file may be forwarded from the server computer to the client computer. In the client computer, a second hash value of the file may be calculated and compared against a second hash value of the malicious code pattern to determine if the file is infected with the malicious code.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
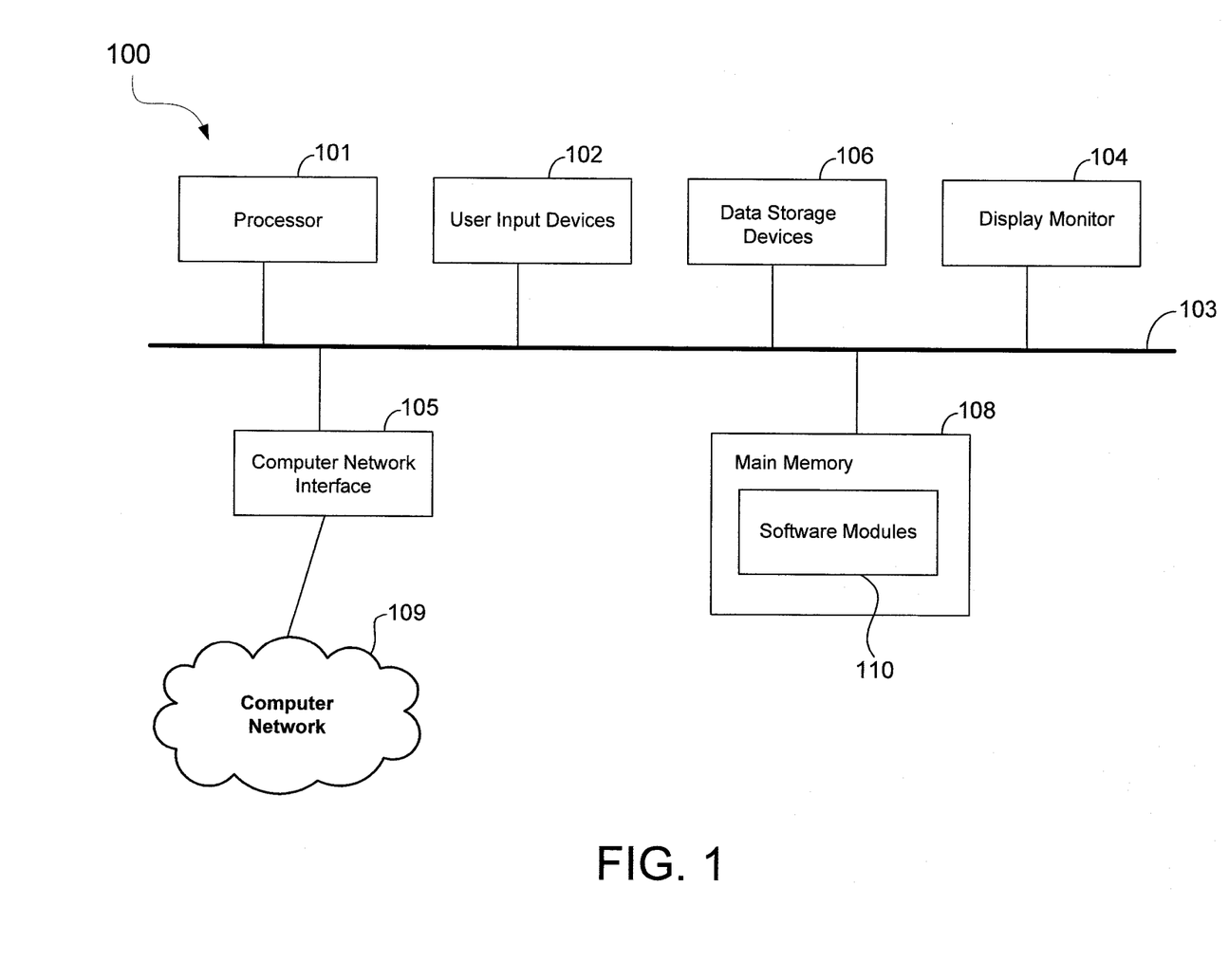
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer 201 or security server computer 202 (see FIG. 2), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may comprise computer-readable program code (i.e., software) components of a client computer 201 or security server computer 202, for example. The software modules 110 may be loaded from the data storage device 106 to the main memory 108 for execution by the processor 101.

Figure 2:
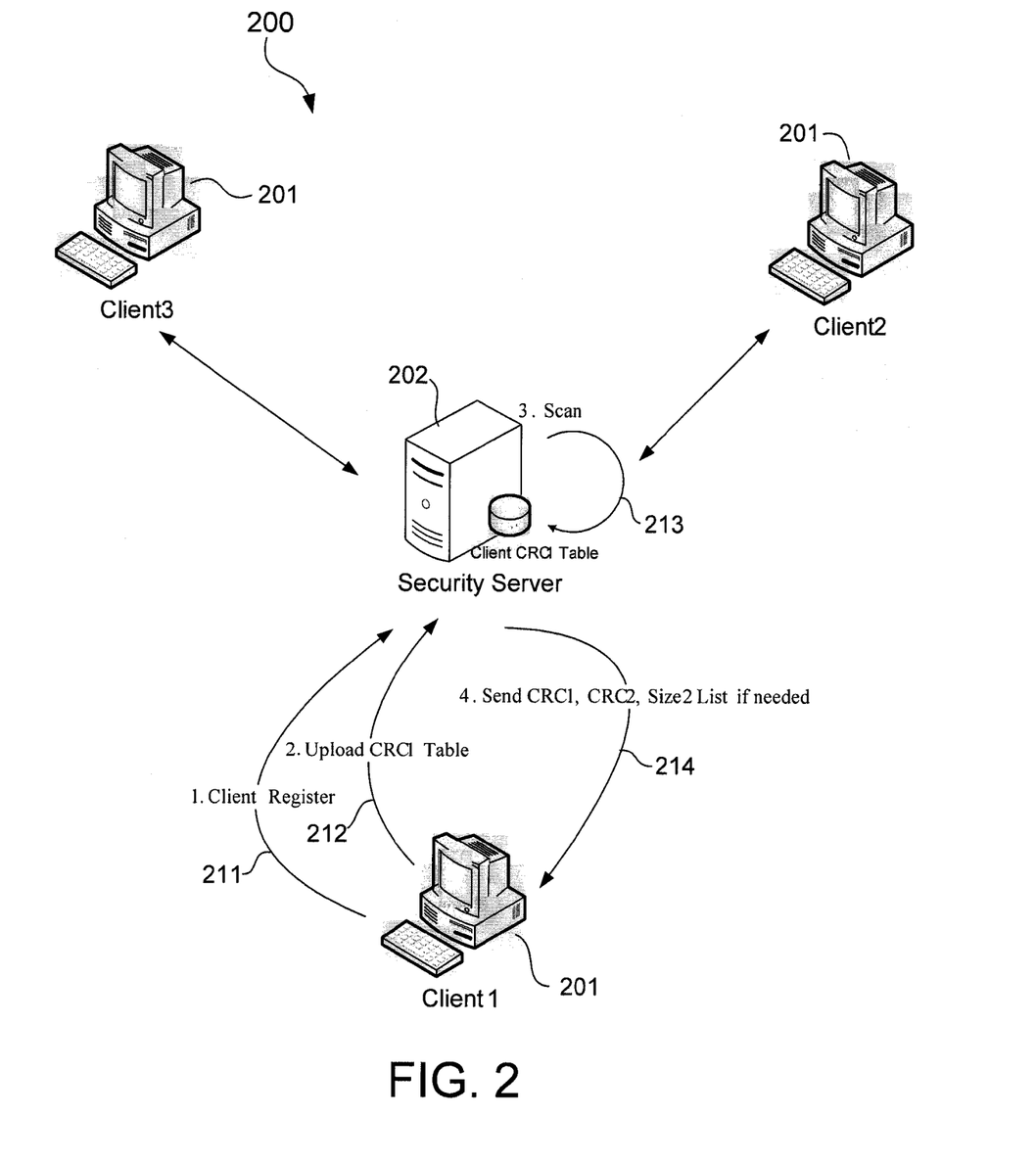
FIG. 2 schematically shows a system for scanning computer data for malicious codes in accordance with an embodiment of the present invention.

FIG. 2 schematically shows a system 200 for scanning computer data for malicious codes in accordance with an embodiment of the present invention. In the example of FIG. 2, the system 200 is configured to scan computer files in a data storage device, such as a hard disk drive, of a client computer 201. As will be more apparent below, the system 200 is able to perform the scanning without necessarily doing a full scan of the data storage device in the client computer 201 or without necessarily providing the entirety of a pattern file to the client computer 201.

In the example of FIG. 2, the system 200 includes one or more client computers 201 and one or more security server computers 202. Preferably, one security server computer 202 provides remote scanning services to two or more client computers 201. The client computers 201 and a security server computer 202 may communicate over a computer network, such as the Internet.

In an example operation, a client computer 201 may register with the security server computer 202 (arrow 211). The registration allows client computer 201 to allocate a substantial portion of the scanning load to the security server computer 202. Once the security server computer 202 validates the client computer 201 as a subscribing computer, the client computer 201 uploads to the security server computer 202 (arrow 212) a listing of hash values of files stored in the client computer 201's data storage device, which is a hard disk drive in this example. In one embodiment, the hash values comprise cyclic redundancy check (CRC) values of files in the hard disk drive. For each file, the CRC value may be one of at least two hash values of the file. The first hash value may comprise a CRC of a first amount of the file, the first amount being the same for all files (e.g., first 4K bytes of each file), and referred to as CRC1. The second hash value may comprise a CRC of a second amount of the file that may vary between files. That is, the second amount may vary in size between files and referred to as CRC2. Hash algorithms other than CRC may also be used without detracting from the merits of the present invention.

The listing of hash values sent by the client computer 201 to the security server computer 202 may comprise a listing of first hash values, not hash values of entirety of files. That is, the listing of hash values does not necessarily include the second hash values. In the example of FIG. 2, the listing of hash values comprises a table of CRC1 values, and the table does not include CRC2 values. This advantageously minimizes network bandwidth consumed by the remote scanning process by sending a hash of a portion, not necessarily the entirety, of files that will be scanned for malicious codes.

In one embodiment, the security server computer 202 maintains the uploaded CRC1 values of files of the client computers 201. The security server computer 202 also keeps updated patterns of malicious codes. The patterns may be indicative of presence of malicious codes. Each malicious code may be identified as a pattern comprising a first hash value and a second hash value, with the size of the first hash value being a fixed amount uniform for all files and the second hash value being a variable amount that may be different sizes for different files. In one embodiment, each malicious code may be identified using a malicious code pattern that comprises a CRC1 value of a fixed amount of a file infected with the malicious code, a CRC2 value of a variable amount of the file infected with the malicious code, and an identification of the file size from which the CRC2 was calculated. For example, the CRC1 value may be a hash of the first 4K bytes of an infected file, and the CRC2 value may be a hash of n bytes of the infected file, with n being a size range taken starting from a predetermined file location (e.g., beginning of the file). In that example, a malicious code pattern may comprise CRC1, size n of CRC2, and CRC2.

Maintaining the full patterns of malicious codes in the security server computer 202 advantageously minimizes memory constraints in the client computers 201. This is advantageous in that the client computers 201 are generally small personal computers, whereas the security server computer 202 is generally a more powerful server computer. The security server computer 202 may also be maintained by the antivirus product vendor providing the scanning service, whereas the client computers 201 may be operated by customers.

The security server computer 202 scans the first hash values of files against first hash values of malicious code patterns (arrow 213). In one embodiment, the security server computer 202 compares the CRC1 values received from client computers 201 against CRC1 values of malicious code patterns. If there is a match, there is a chance that a file in a client computer 201 is infected with malicious code. In that case, the security server computer 202 sends the malicious code pattern that includes the matching first hash value to the client computer 201 (arrow 214). In this example, the security server computer 202 sends the CRC1, CRC2, and size n of CRC2 of the malicious code pattern to the client computer 201. The client computer 201 finds the file with a CRC1 matching that of the malicious code pattern and calculates the CRC2 of the file. If the CRC2 of the file matches that of the malicious code pattern, the file is deemed infected with malicious code.

As can be appreciated from the foregoing, the system 200 advantageously allows malicious code scanning of files of a storage device of a client computer 201 without having to perform the entirety of the disk scanning in the client computer 201. The system 200 also advantageously allows malicious code scanning of the files without the client computer 201 necessarily maintaining full pattern files. In the example of FIG. 2, the client computer 201 only receives malicious code patterns having portions that match those of files in the client computer 201.

Figure 3:
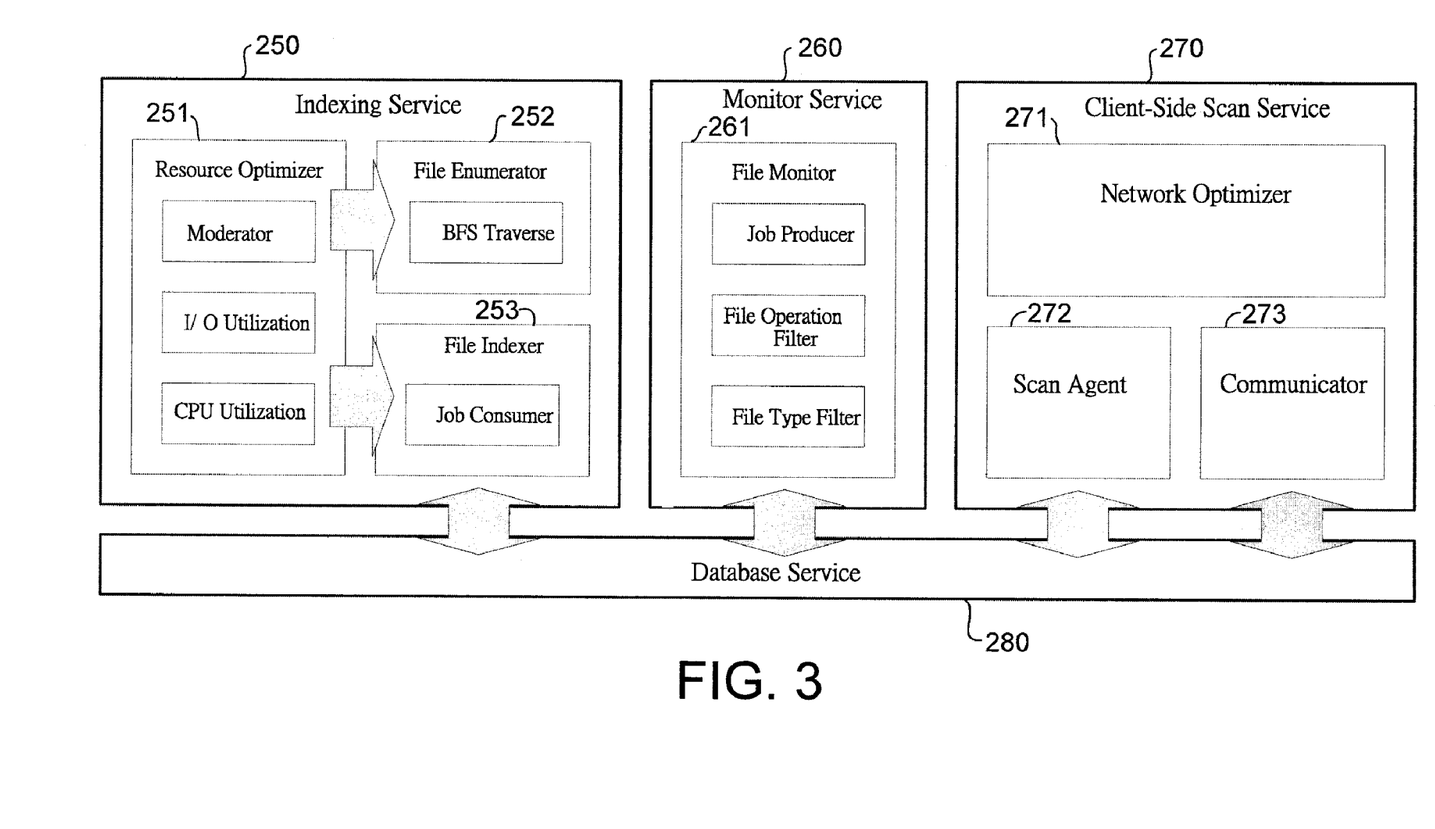
FIG. 3 schematically shows details of a client computer in the system of FIG. 2 in accordance with an embodiment of the present invention.

FIG. 3 schematically illustrates details of a client computer 201 in accordance with an embodiment of the present invention. In the example of FIG. 3, the client computer 201 includes an indexing service 250, a monitoring service 260, a client-side scan service 270, and a database service 280. In one embodiment, these services may be provided by computer-readable program code running in memory.

The indexing service 250 may comprise a resource optimizer 251, a file enumerator 252, and a file indexer 253. The indexing service 250 allows for calculation of first hash values and indexing of files whose first hash values have been calculated.

The file enumerator 252 may comprise computer-readable program code configured to enumerate files that have not been indexed by the file indexer 253. An indexed file is one for which a first hash value has been calculated and is so identified in a database accessible by way of the database service 280. In one embodiment, the first hash value comprises a CRC1 value. The CRC1 values of indexed files may be stored in a CRC1 table accessible by way of the database service 208. The file enumerator 252 thread mainly runs when the scanning system is installed in the client computer 201 for the first time. The file enumerator 252 also keeps the index of files up to date in the event of an unexpected shutdown of services (e.g., manual cancellation by the user, computer crash) during the file indexing process. In one embodiment, the file enumerator 252 employs a Breadth-First Search (BFS) strategy to search for files in data storage devices of the client computer 201. Other file searching strategies may also be used. Preferably, the file enumerator 252 is configured to enumerate portable executable (PE) files and not signed files for improved performance.

The file indexer 253 may comprise computer-readable program code for calculating the first hash values of a file. In one embodiment, the file indexer 253 calculates a CRC1 value of a fixed size of a file, such as the CRC of the first 4K bytes of the file starting from the beginning of the file. The file indexer 253 may also calculate the first hash value using hashing functions other than CRC. The files for which the first hash value needs to be calculated may be identified by either the file enumerator 252 or a file monitor 261 (see the monitor service 260). In other words, the jobs consumed by the file indexer 253 may come from the file enumerator 252 or the file monitor 261. The file indexer 253 may be configured to store the CRC1 value of a file and other information about the file, such as its location in the client computer 201 (e.g., by file path), last modified time, etc. using the database service 260.

The resource optimizer 251 may comprise computer-readable program code for controlling the operation of the file enumerator 252 and the file indexer 253 to obtain optimum computing resource utilization. In one embodiment, the resource optimizer 251 is configured to minimize disruption to normal user operation. For example, the resource optimizer 251 may lower the CPU priority of the file indexer 253 when multimedia, such as a DVD movie, is being played in the client computer 201.

The monitor service 260, which may comprise a file monitor 261, allows for monitoring of file activities in the client computer 201. The file monitor 261 may comprise computer-readable program code for monitoring file activities, such as file creation, modification, deletion, and the like. The file monitor 261 may be configured to filter out (i.e., ignore and not monitor for) particular types of files and file activities. For example, the file monitor 261 may be configured to monitor PE files, but not signed files. The file monitor 261 may be configured to identify newly created and modified files to the file indexer 253 in the form of jobs. The file indexer 253 may consume the job by calculating the first hash values of the newly created and modified files and store the first hash values using the database service 280. The file monitor 260 may also report deleted files to the file indexer 253 so that the file indexer 253 may remove the deleted file's CRC1 and other information from the database service 280.

Figure 4:
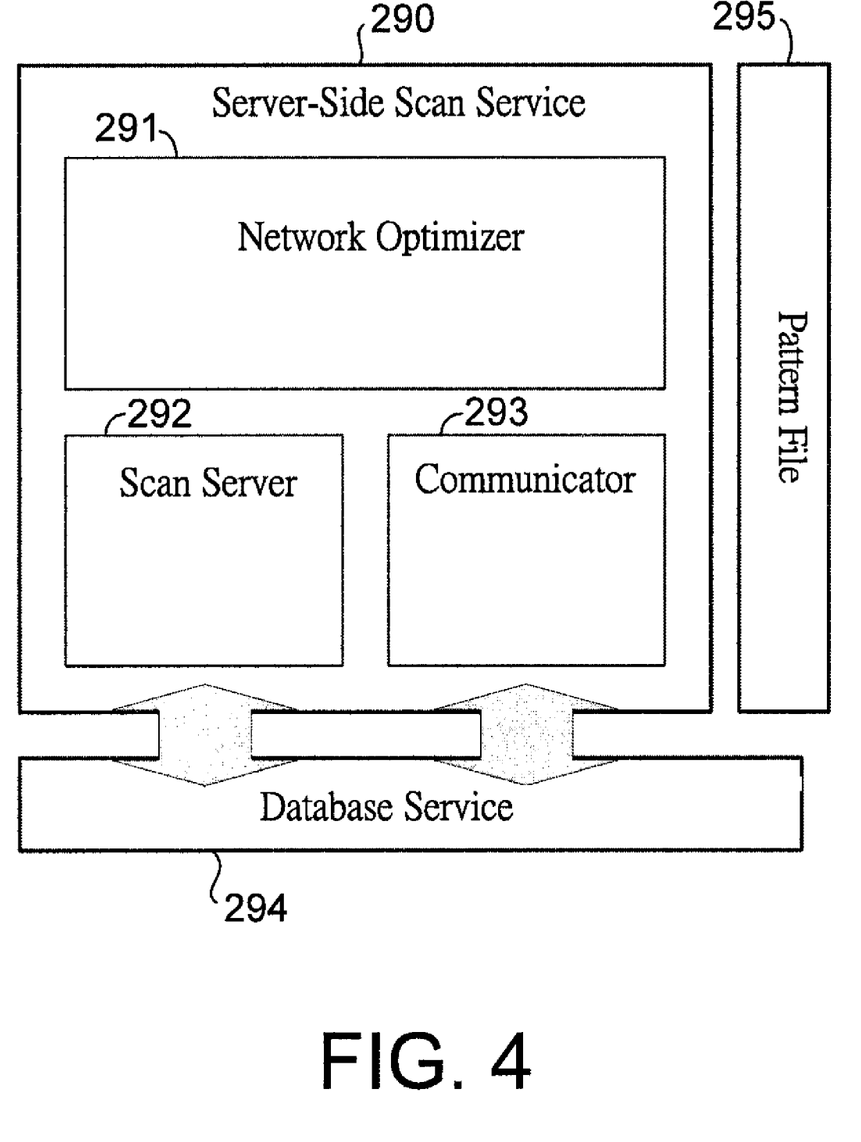
FIG. 4 schematically shows details of a security server computer in the system of FIG. 2 in accordance with an embodiment of the present invention.

The client-side scan service 270 allows for antivirus operations in conjunction with a remote server-side scan service 290 (see FIG. 4). The client-side scan service 270 may comprise a network optimizer 271, a scan agent 272, and a communicator 273.

The scan agent 272 may comprise computer-readable program code for determining if a file in the client computer 201 is infected with malicious code and take responsive actions as necessary. In one embodiment, the scan agent 272 is configured to calculate a second hash value of a file and compare the second hash value of the file to a second hash value of a malicious code pattern to determine if the file is infected with malicious code, such as a computer virus. If a CRC1 value of a file in the client computer 201 matches a CRC1 of a malicious code pattern as determined by the security server computer 202, the security server computer 202 may provide the malicious code pattern's CRC1, CRC2, and a size n of the CRC2 to the client computer 201. The scan agent 272 may be configured to receive the malicious code pattern from the communicator 273, identify the suspect file by finding its location from the database service 280, calculate the CRC2 value of the first n bytes of the suspect file and compare the CRC2 value of the suspect file to the CRC2 value of the malicious code pattern. If the CRC2 values match, the scan agent 272 may deem the suspect file infected and take a response action. The response action may involve alerting the user/administrator of the client computer 201, cleaning the suspect file, putting the suspect file in quarantine, deleting the suspect file, etc.

The communicator 273 may comprise computer-readable program code for communicating with the server-side scan service 290 in the security server computer 202 (FIG. 4). The communicator 273 may be configured to transmit new or updated first hash values to the security server computer 202, perform compression to minimize network bandwidth consumption, and receive malicious code patterns from the security server computer 202. As explained, the malicious code patterns may comprise only those that have matching first hash values with files in the client computer 201. This advantageously minimizes storage of patterns and pattern matching operations in the client computer 201.

The network optimizer 271 may comprise computer-readable program code for controlling network bandwidth consumption of the communicator 273. For example, the network optimizer 271 may be configured to lower the CPU priority of the communicator 273 or limit its bandwidth when files are being downloaded to the client computer 201.

FIG. 4 schematically shows further details of a security server computer 202 in accordance with an embodiment of the present invention. In the example of FIG. 4, the security server computer 202 includes a server-side scan service 290, a database service 294, and a pattern file 295. The server-side scan service 290 and a database service 294 may be provided by computer-readable program code running in memory.

In one embodiment, the pattern file 295 comprises patterns for identifying known malicious codes. These malicious code patterns may be compiled by antivirus researchers. Updates to the pattern file 295 may be obtained over the Internet. Each malicious code pattern in the pattern file 295 may comprise a first hash value in the form of a CRC1 value, a second hash value in the form of a CRC2 value, and a size n of the second has value. More specifically, a malicious code pattern may have the form:

CRC1, CRC2, size n of CRC2 where CRC1 comprises a CRC value of the first fixed size bytes (e.g., first 4K bytes) of a file starting from the beginning of the file, CRC2 comprises a CRC value of n bytes of the file starting from the beginning of the file.

The scan server 292 may comprise computer-readable program code for determining if a file in the client computer 201 may be infected with malicious code. In one embodiment, the scan server 292 is configured to compare the first hash values of files stored in the client computer 201 with the first hash values of malicious code patterns in the pattern file 295. When a first hash value of a file stored in the client computer 201 matches a first hash value of a malicious code pattern in the pattern file 295, the scan server 292 may deem the file as a suspect file. In that case, the scan server 292 may so inform the communicator 293, which may then provide the entirety of the malicious code pattern to the corresponding client computer 201. For example, if the scan server 292 finds that a file in the client computer 201 has a CRC1 value that matches a CRC1 value of a malicious code pattern, the scan server 292 may report that file, referred to as "suspect file," to the communicator 293, which then provides the CRC1 value, the CRC2 value, and the size n of the CRC2 value to the client computer 201. The scan server 292 may be configured to perform the first hash value comparisons whenever there is a new file entry in the database service 294 or there is a new malicious code pattern in the pattern file 295 (e.g., every time there is a pattern file update).

The communicator 293 may comprise computer-readable program code for communicating with the client-side scan service 270 in the client computer 201. The communicator 293 may be configured to receive new or updated first hash values from the client computer 201, perform compression to minimize network bandwidth consumption, and provide malicious code patterns to the client computer 201. In one embodiment, the malicious code patterns may comprise only those that have been identified by the scan server 292 as having matching first hash values with files in the client computer 201.

The network optimizer 291 may comprise computer-readable program code for controlling network bandwidth consumption of the communicator 293, and is similar in operation to the network optimizer 271 in the client computer 201. More specifically, the network optimizer 291 may be configured to adjust the CPU priority or bandwidth allocation of the communicator 293 depending on network activity of the security server computer 202.

Figure 5:
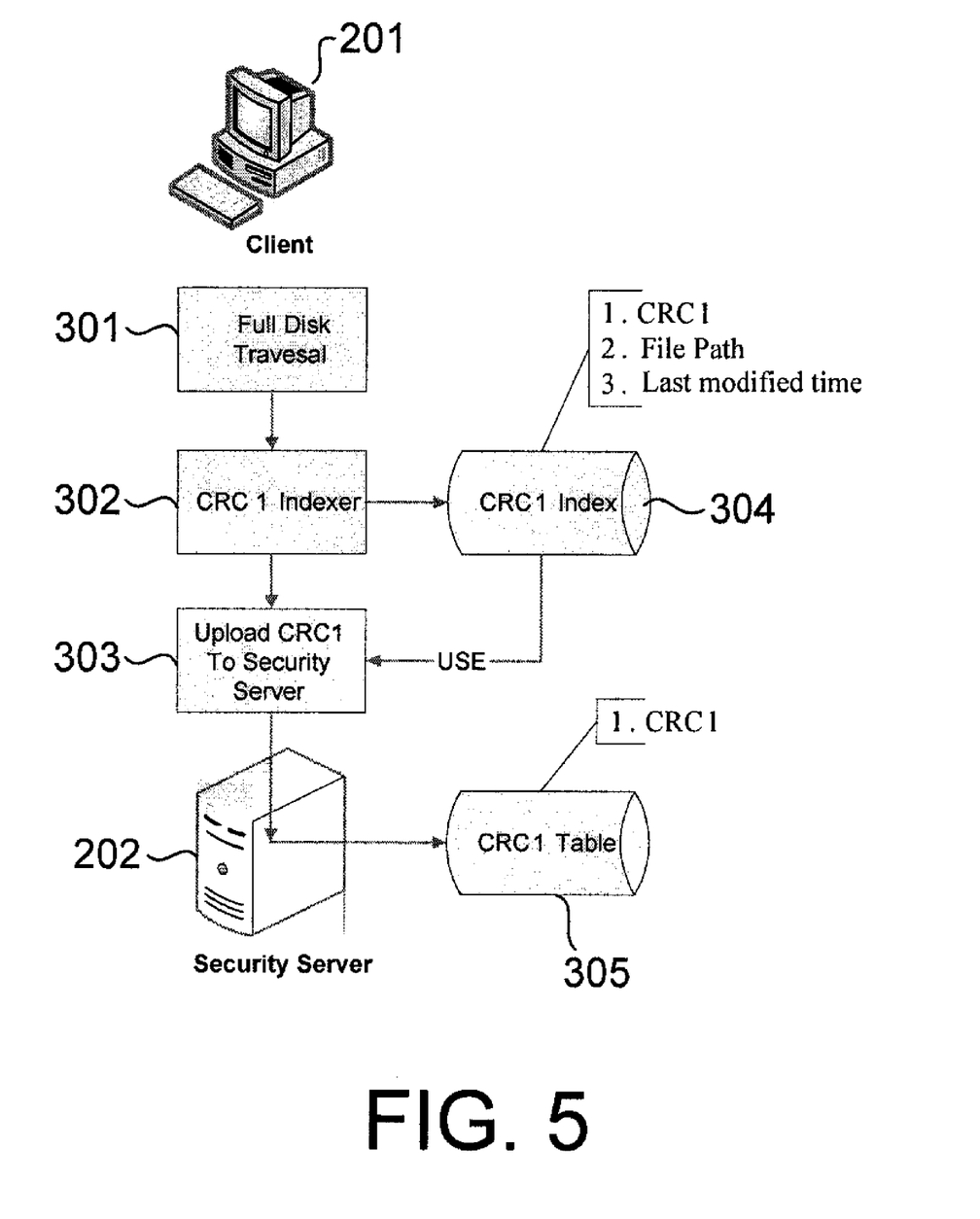
FIG. 5 shows a flow diagram schematically illustrating creation of first hash values in a client computer in accordance with an embodiment of the present invention.

FIG. 5 shows a flow diagram schematically illustrating creation of first hash values in a client computer 201 in accordance with an embodiment of the present invention. In the example of FIG. 5, the file enumerator 252 discovers all files stored in data storage devices of the client computer 201 (block 301). For example, the file enumerator 252 may perform a full disk traversal using a BFS strategy to obtain the file paths of files in the client computer 201. The file enumerator 252 informs the file indexer 253 of the files and their file paths. The file indexer 253 computes the CRC1 values of the files and stores each of the files' CRC1 value, file path, and last modified time in a CRC1 index 304 (block 302). The communicator 273 uploads the CRC1 values (not necessarily including the file paths and last modified times to save bandwidth) in the form of a CRC1 table 305 to the security server computer 202 (block 303). The security server computer 202 may maintain a CRC1 table 305 for each registered client computer 201.

Figure 6:
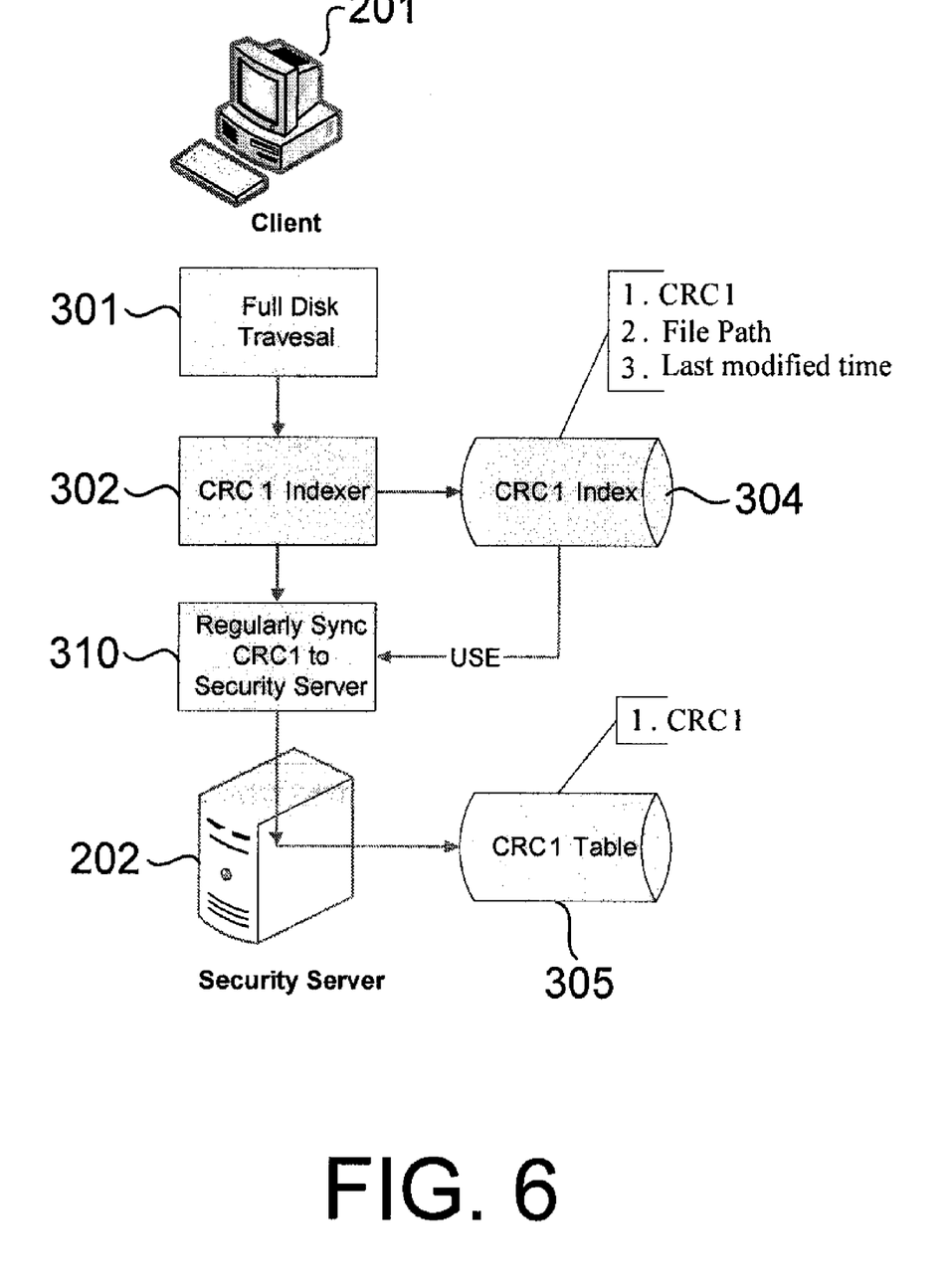
FIG. 6 shows a flow diagram schematically illustrating maintenance of first hash values in a client computer in accordance with an embodiment of the present invention.

FIG. 6 shows a flow diagram schematically illustrating maintenance of first hash values in a client computer 201 in accordance with an embodiment of the present invention. The flow diagram of FIG. 6 is the same as that of FIG. 5 except that the communicator 273 synchronizes CRC1 values with the security server computer 202 whenever the file monitor 261 indicates that one or more files in the client computer 201 have been newly created or modified. In that case, the file indexer 253 computes the CRC1 value of the newly created or modified files (block 302) and updates the CRC1 index 304. The communicator 273 then provides the updated CRC1 values to the security server computer 202 (block 310).

In the examples of FIGS. 5 and 6, the server-side scan service 290 in the security server computer 202 compares the CRC1 values uploaded by the client computer 201 against the CRC1 values of malicious code patterns. If there is a match, the server-side scan service 290 provides the CRC1 value, CRC2 value, and size of the CRC2 value of the matching malicious code pattern to the client computer 201.

Figure 7:
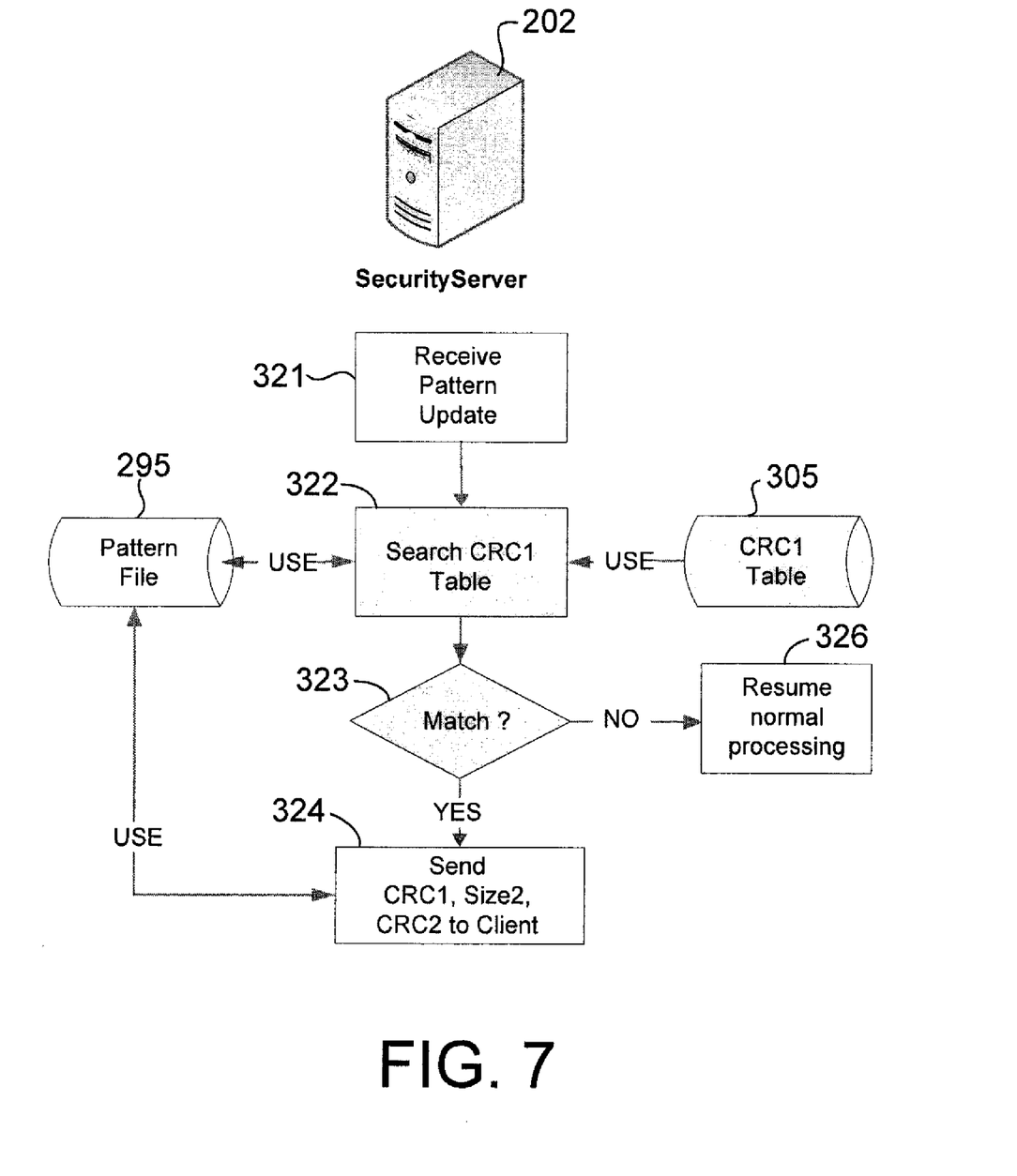
FIG. 7 shows a flow diagram schematically illustrating scanning of computer data for malicious codes in a remote server computer in accordance with an embodiment of the present invention.

FIG. 7 shows a flow diagram schematically illustrating scanning of computer data for malicious codes in a remote server computer in accordance with an embodiment of the present invention. In the example of FIG. 7, the security server computer 202 receives updated malicious code patterns (block 321) over a computer network, such as the Internet, for example. The scan server 292 of the server-side scan service 290 checks the CRC1 table 305 of the client computer 201 for CRC1 values matching that of malicious code patterns stored in an updated pattern file 295 (block 322).

The server-side scan service 290 may resume normal processing when the CRC1 table 305 has no CRC1 value matching that of the updated pattern file 295 (block 323 to block 326)

If there is a match (block 323 to block 324), the scan server 292 so informs the communicator 293, which then sends the entirety of the matching malicious code pattern to the client computer 201. In this example, the communicator 293 sends the CRC1 value, the CRC2 value, and size of the CRC2 value of each matching malicious code pattern to the client computer 201. As can be appreciated, the security server computer 202 may have a CRC1 table 305 for each subscribing client computer 201. The scan server 292 may inform the communicator 293 which CRC1 table 305 has a match with the malicious code pattern 295 so that the communicator 293 may identify the affected client computer 201 and accordingly send the matching malicious code pattern to that client computer.

Figure 8:
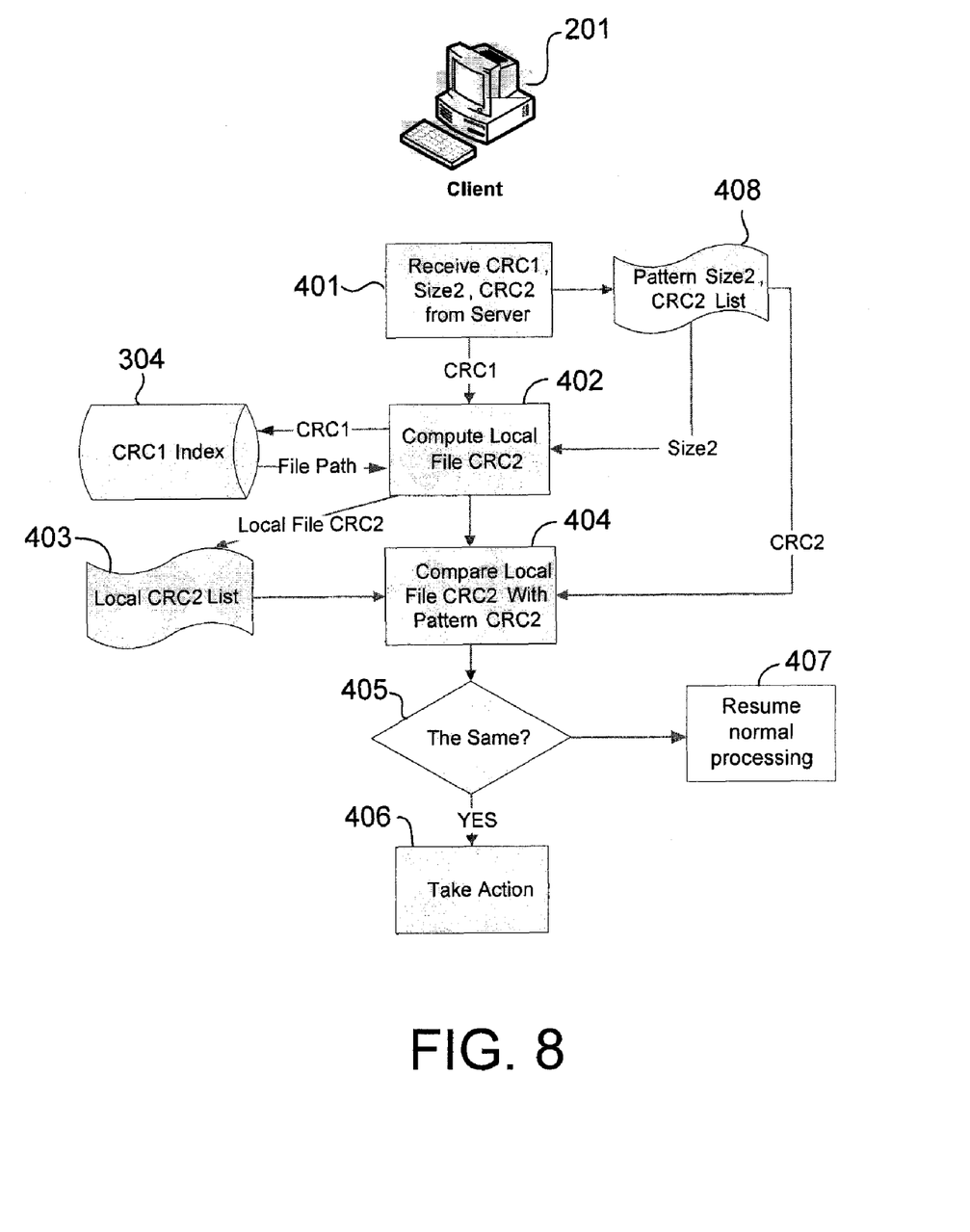
FIG. 8 shows a flow diagram schematically illustrating scanning of computer data for malicious codes in a client computer in accordance with an embodiment of the present invention.

FIG. 8 shows a flow diagram schematically illustrating scanning of computer data for malicious codes in a client computer in accordance with an embodiment of the present invention. The flow diagram of FIG. 8 follows receipt of a matching malicious code pattern from the security server computer 202 (block 401). In that case, the communicator 273 of the client-side scan service 270 stores the CRC2 value and the size of the CRC2 value in a pattern list 408. The scan agent 272 consults the CRC1 index 304 for the file path of the suspect local file using the CRC1 value received from the security server computer 202 (block 402). The scan agent 272 finds the suspect local file and computes its CRC2 value using the CRC2 size (block 402). The scan agent 272 stores the suspect local file's CRC2 value in a local CRC2 list 403. The scan agent 272 then compares the suspect local file's CRC2 value with the CRC2 value of the matching malicious code pattern. If the CRC2 values of the suspect local file and the matching malicious code pattern are the same (i.e., there is a match), the scan agent 272 deems the suspect local file to be infected with malicious code and accordingly takes a response action (block 405 to block 406). Otherwise, the client-side scan service 270 resumes normal processing (block 405 to block 407).

Figure 9:
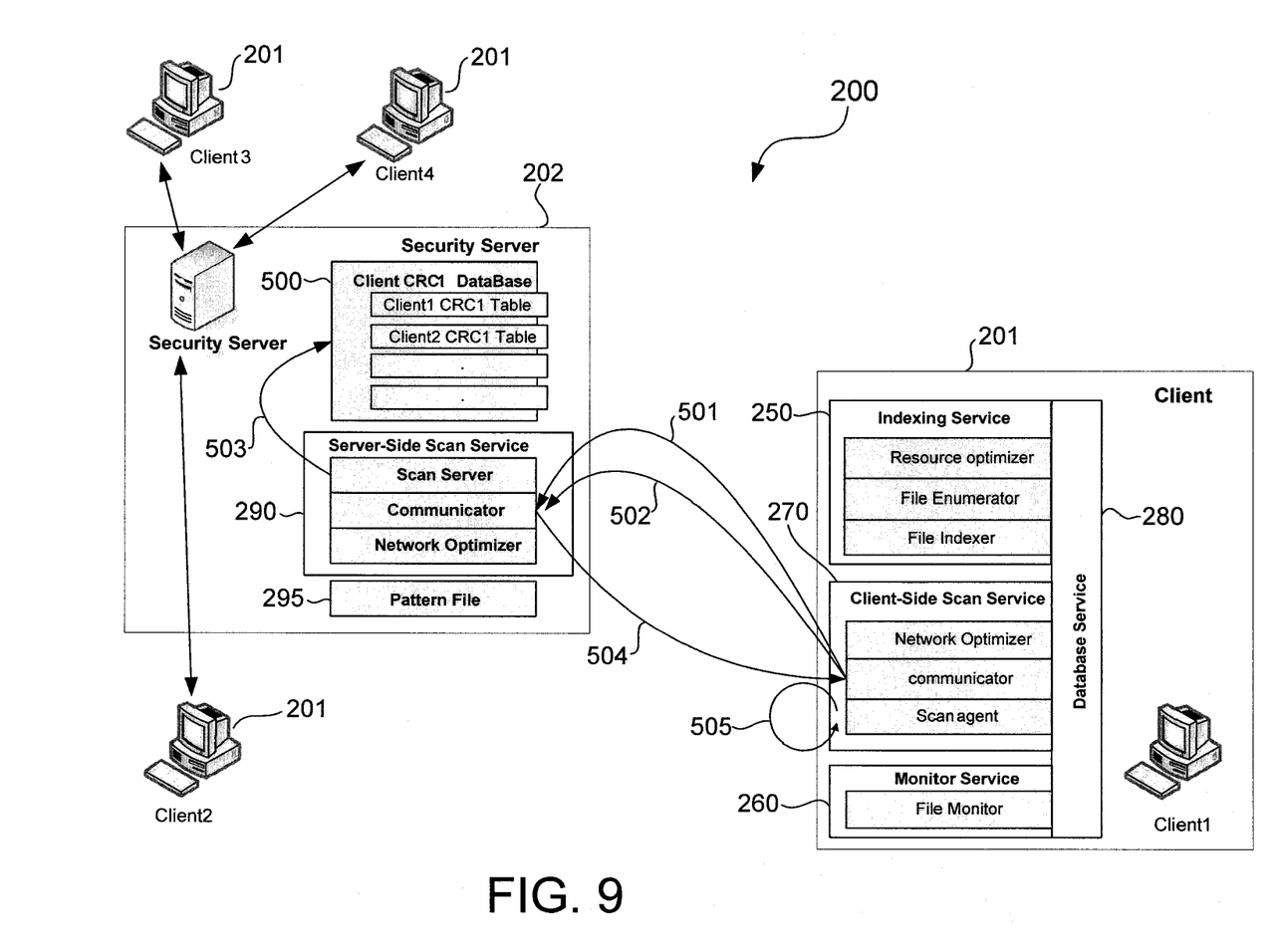
FIG. 9 shows a flow diagram schematically illustrating operation of the system of FIG. 2 in accordance with an embodiment of the present invention.

FIG. 9 shows a flow diagram schematically illustrating operation of the system 200 of FIG. 2 in accordance with an embodiment of the present invention. In the example of FIG. 2, the system 200 includes a security server computer 202 configured to provide malicious code scanning services to a plurality of client computers 201. A client computer 201 may include an indexing service 250, a monitor service 260, a client-side scan service 270, and a database service 280. The server computer 202 may include a scan service 290 and a pattern file 295. These components of the client computers 201 and the security server computer 202 are as described with reference to FIGS. 3 and 4.

In the example of FIG. 9, the security server computer 202 includes a client CRC1 database 500 containing tables of first hash values for each subscribing client computer 201. More specifically, the client CRC1 database 500 may comprise CRC1 tables received from client computers 201.

In an example operation, the indexing service 250 prepares a CRC1 table containing CRC1 values of files in one or more data storage devices in a client computer 201. The client-side scan service 270 registers to perform remote malicious code scanning with the security server computer 202 (arrow 501). The client-side scan service 270 provides its CRC1 table to the security server computer 202 (arrow 502). In the security server computer 202, the server-side scan service 290 determines if the files in the client computer 201 may be infected with malicious code by comparing CRC1 values from the client computer 201 to CRC1 values of malicious code patterns stored in the pattern file 295 (arrow 503). The server-side scan service 290 may perform the check for malicious codes when the client computer 201 initially uploads its CRC1 table or whenever there is a malicious code pattern update or changes to the CRC1 values in the CRC1 table.

If the server-side scan service 290 finds a CRC1 value of a malicious code pattern matching a CRC1 value in the CRC1 table of the client computer 201, the server-side scan service 290 deems that a file in the client computer 201 is possibly infected with malicious code. Accordingly, the server-side scan service 290 forwards the CRC1 value, the CRC2 value, and size of the CRC2 value of the matching malicious code pattern to the client computer 201 (arrow 504). In the client computer 201, the client-side scan service 270 finds the suspect file having the matching CRC1 value, calculates the CRC2 value of the suspect file using the CRC2 value size, and compares the CRC2 value of the suspect file against the CRC2 value of the matching malicious code pattern (arrow 505). If the CRC2 values match, the client-side scan service 270 deems the suspect file to be infected with malicious code and take appropriate response action.

Figure 10:
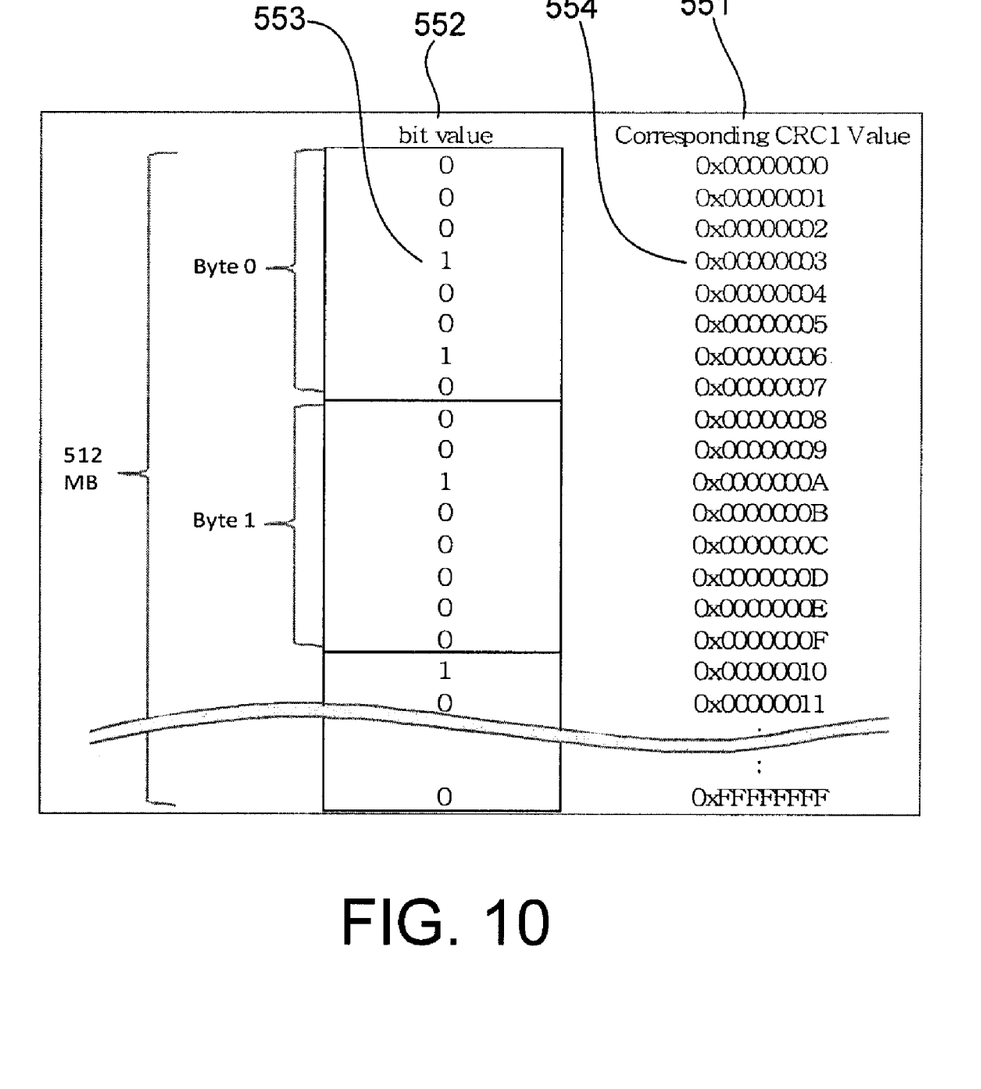
FIG. 10 shows an example table of first hash values in accordance with an embodiment of the present invention.

In one embodiment, a table of first hash values is implemented using a coding scheme that allows the table to have a fixed size, provides for relatively fast query speeds, and is relatively easy to implement. An example of such a table is shown in FIG. 10, where each CRC1 value comprises a 32-bit positive integer from 0 to 4G-1 (i.e., zero to four gigabytes minus one) (see 551). Each CRC1 table may have a size of 512 MB, with each byte having bit values (see 552) indicating whether a corresponding CRC1 value exists in the client computer 201. For example, in FIG. 10, setting bit 3 of byte 0 (see 553) indicates that the client computer 201 has a file with a CRC1 value of 0x00000003 (see 554). The scan server 292 of the server-side scan service 290 can readily check the CRC1 table of FIG. 10 for bit values that are set (i.e., a logical HIGH), find the corresponding CRC1 values, and compare the CRC1 values to those of malicious code patterns to determine if one or more files in a corresponding client computer 201 may be infected with malicious code.

Figure 11:
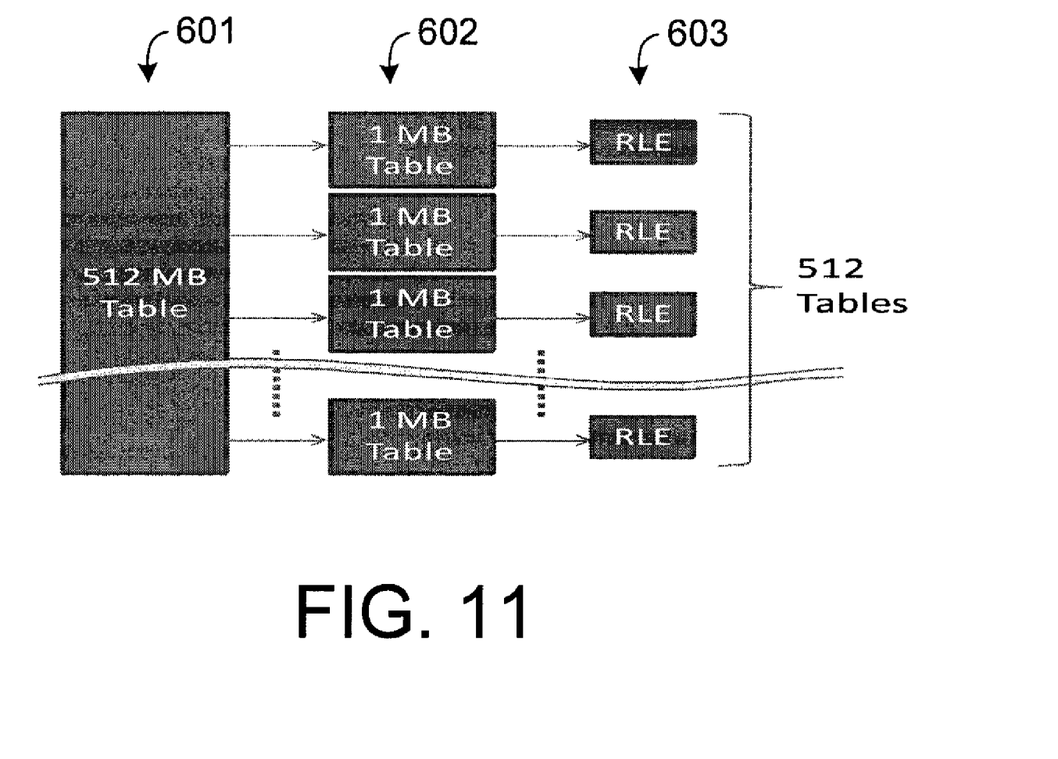
FIG. 11 schematically illustrates a table compression algorithm that may be used to compress a table of first hash values in accordance with an embodiment of the present invention.

FIG. 11 schematically illustrates a table compression algorithm that may be used to compress a table of first hash values in accordance with an embodiment of the present invention. In the example of FIG. 11, a 512 MB CRC1 table (see 601; e.g., CRC1 table of FIG. 10) is divided into 512 sub-tables of 1 MB each (see 602). Each sub-table may then be compressed (see 603). For example, each sub-table may be compressed using run-length encoding (RLE). Other compression algorithms may also be used without detracting from the merits of the present invention. By dividing the CRC1 table into sub-tables and compressing each sub-table, the size of the CRC1 table is reduced while allowing for relatively fast queries.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of scanning computer data for malicious codes, the method comprising:

calculating first hash values of a plurality of files stored in a storage device of a client computer, each of the first hash values being a hash value of less than an entirety of a corresponding file in the plurality of files;

forwarding the first hash values to a remotely located server computer over a computer network coupling the client computer and the server computer;

comparing the first hash values of the plurality of files to first hash values of a plurality of malicious code patterns, a malicious code pattern in the plurality of malicious code patterns comprising a first hash value and a second hash value;

detecting that the first hash value of the malicious code pattern matches a first hash value of a suspect file in the plurality of files, the first hash value of the suspect file being calculated from less than an entirety of the suspect file;

in response to detecting that the first hash value of the malicious code pattern matches the first hash value of the suspect file, forwarding the second hash value of the malicious code pattern from the server computer to the client computer;

forwarding a size of the second hash value of the malicious code pattern from the server computer to the client computer;

calculating a second hash value of the suspect file in the client computer; and in the client computer, determining whether the suspect file is infected with malicious code by comparing the second hash value of the suspect file with the second hash value of the malicious code pattern received from the server computer.

2. The method of claim 1 wherein the first hash values of the plurality of files and the first hash values of the malicious code patterns comprise cyclic redundancy check (CRC) values.

3. The method of claim 1 wherein the malicious code patterns comprise patterns of computer viruses.

4. The method of claim 1 wherein the server computer maintains tables of first hash values of files of a plurality of client computers registered to perform remote malicious code scanning with the server computer.

5. The method of claim 1 wherein the client computer calculates the second hash value of the suspect file based on the size of the second hash value of the malicious code pattern.

6. The method of claim 1 wherein the client computer locates the suspect file by consulting a table comprising the first hash value of the suspect file and a file path of the suspect file.

7. A system for scanning computer data for malicious code, the system comprising:

a client computer configured to calculate a first hash value representing a first portion of a file stored in a storage device of the client computer, to transmit the first hash value of the first portion of the file over a computer network, to receive a second hash value of a second portion of a malicious code pattern from a server computer over a computer network when the file is possibly infected with malicious code, to calculate a second hash value of a second portion of the file, and to compare the second hash value of the second portion of the file against the second hash value of the second portion of the malicious code pattern to determine whether the file is infected with the malicious code, the malicious code pattern comprising the first hash value of the first portion of the malicious code pattern and the second hash value of the second portion of the malicious code pattern, wherein the client computer is configured to receive a size of the second hash value of the second portion of the malicious code pattern and use the size of the second hash value of the second portion of the malicious code pattern to calculate the second hash value of the second portion of the file; and the server computer configured to receive the first hash value of the first portion of the file, to determine whether the file is possibly infected with the malicious code based on the first hash value of the first portion of the file, and to provide the second hash value of the second portion of the malicious code pattern and a size of the second hash value of the second portion of the malicious code pattern to the client computer when the file is possibly infected with the malicious code based on the first hash value of the first portion of the file.

8. The system of claim 7 wherein the first hash value of the first portion of the file and the first hash value of the first portion of the malicious code pattern comprise cyclic redundancy check (CRC) values.

9. The system of claim 7 wherein the server computer is configured to maintain a database containing first hash values of files of a plurality of client computers.

10. The system of claim 9 wherein the server computer is configured to check the database for possible infected files in the plurality of client computers whenever the server computer receives an updated pattern file containing malicious code patterns.

11. The system of claim 9 wherein the first hash values of the files in the database all have the same fixed size.

12. The system of claim 7 wherein the server computer is configured to determine whether the file is possibly infected with the malicious code by comparing the first hash value of the first portion of the file with the first hash value of the first portion of the malicious code pattern.

13. The system of claim 7 wherein the client computer is one of a plurality of client computers registered to perform malicious code scanning of files with the server computer.

14. A method of scanning computer data for malicious code, the method comprising:

locating a file stored in a storage device of a client computer, the file comprising a first portion and a second portion;

forwarding a first hash value indicative of the first portion of the file from the client computer to a server computer over a computer network;

comparing the first hash value indicative of the first portion of the file against a malicious code pattern in the server computer to determine whether the file is possibly infected with malicious code, the malicious code pattern comprising a first hash value and a second hash value;

forwarding at least the second hash value of the malicious code pattern from the server computer to the client computer;

forwarding a size of the second hash value of the malicious code pattern from the server computer to the client computer; and in the client computer, determining whether the file is infected with malicious code by comparing the second hash value of the malicious code pattern received from the server computer to a second hash value indicative of the second portion of the file.

15. The method of claim 14 wherein the first hash value of the malicious code pattern comprises a cyclic redundancy check (CRC).

16. The method of claim 14 wherein the malicious code comprises a computer virus.

17. The method of claim 14 wherein determining whether the file is infected with the malicious code comprises:

calculating the second hash value indicative of the second portion of the file; and comparing the second hash value indicative of the second portion of the file against the second hash value of the malicious code pattern.

* * * * *